US012587701B2

(12) United States Patent
Shah et al.

(10) Patent No.: US 12,587,701 B2
(45) Date of Patent: Mar. 24, 2026

(54) METHODS AND SYSTEMS FOR SYNCHRONIZING PLAYBACK OF MEDIA CONTENT ITEMS

(71) Applicant: Adeia Guides Inc., San Jose, CA (US)

(72) Inventors: Akshay Chetan Shah, Mumbai (IN); Padmassri Chandrashekar, Karnataka (IN); Daina Emmanuel, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 15 days.

(21) Appl. No.: 18/667,916

(22) Filed: May 17, 2024

(65) Prior Publication Data

US 2024/0305853 A1 Sep. 12, 2024

Related U.S. Application Data

(63) Continuation of application No. 17/398,487, filed on Aug. 10, 2021, now abandoned.

(51) Int. Cl.
| | |
|---|---|
| *H04N 21/43* | (2011.01) |
| *H04N 21/442* | (2011.01) |
| *H04N 21/45* | (2011.01) |

(52) U.S. Cl.
CPC . *H04N 21/43076* (2020.08); *H04N 21/44245* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 7,360,230 B1 * | 4/2008 | Paz | H04N 7/17318 |
| | | | 375/E7.254 |
| 9,014,535 B2 | 4/2015 | Klappert et al. | |
| 10,158,908 B1 * | 12/2018 | Ramani | H04N 21/4667 |
| 2001/0017887 A1 | 8/2001 | Furukawa et al. | |
| 2002/0024999 A1 | 2/2002 | Yamaguchi et al. | |
| 2003/0052911 A1 | 3/2003 | Cohen-Solal | |
| 2004/0268400 A1 | 12/2004 | Barde et al. | |
| 2008/0271069 A1 | 10/2008 | Kim et al. | |
| 2009/0276821 A1 | 11/2009 | Amento et al. | |
| 2012/0059946 A1 | 3/2012 | Wang | |

(Continued)

FOREIGN PATENT DOCUMENTS

| | | | | |
|---|---|---|---|---|
| WO | 0193161 A1 | 12/2001 | | |
| WO | WO-2011150657 A1 * | 12/2011 | ......... | H04N 21/2402 |

*Primary Examiner* — William J Kim
(74) *Attorney, Agent, or Firm* — HG LAW LLP

(57) ABSTRACT

Systems and methods are described for synchronizing playback of media content items. A first media content item is displayed at first user equipment and second user equipment. At least one playback parameter relating to the operation of the first user equipment and/or the second user equipment is determined. A determination is made as to whether the at least one playback parameter is less than a first playback parameter threshold. In response to determining that the at least one playback parameter is less than the first playback parameter threshold, at least one playback characteristic of the first media content item at the first user equipment and/or the second user equipment is adjusted to cause the display of the first media content item at first user equipment and second user equipment to be synchronized.

20 Claims, 5 Drawing Sheets

(56)         References Cited

U.S. PATENT DOCUMENTS

| | | | |
|---|---|---|---|
| 2012/0192234 A1* | 7/2012 | Britt | H04N 21/4882 |
| | | | 725/98 |
| 2013/0159858 A1 | 6/2013 | Joffray et al. | |
| 2013/0304934 A1 | 11/2013 | Joch et al. | |
| 2014/0025830 A1* | 1/2014 | Grinshpun | H04L 5/0064 |
| | | | 709/227 |
| 2014/0149557 A1 | 5/2014 | Lohmar et al. | |
| 2014/0359075 A1 | 12/2014 | Amidei et al. | |
| 2015/0026358 A1* | 1/2015 | Zhang | H04N 21/44209 |
| | | | 709/231 |
| 2016/0173347 A1 | 6/2016 | Rajapakse | |
| 2016/0234078 A1 | 8/2016 | Jana et al. | |
| 2017/0251235 A1 | 8/2017 | Sanders | |
| 2017/0310926 A1 | 10/2017 | Patel et al. | |
| 2017/0359612 A1 | 12/2017 | Kuplevakhsky | |
| 2019/0394539 A1 | 12/2019 | Zavesky et al. | |
| 2021/0044845 A1 | 2/2021 | Bertolami et al. | |
| 2021/0044855 A1 | 2/2021 | De Boursetty et al. | |
| 2021/0235149 A1 | 7/2021 | Madison et al. | |
| 2021/0266621 A1 | 8/2021 | Marten | |
| 2022/0094961 A1 | 3/2022 | Bae et al. | |
| 2022/0159049 A1 | 5/2022 | Newton et al. | |
| 2023/0052385 A1 | 2/2023 | Shah et al. | |

* cited by examiner

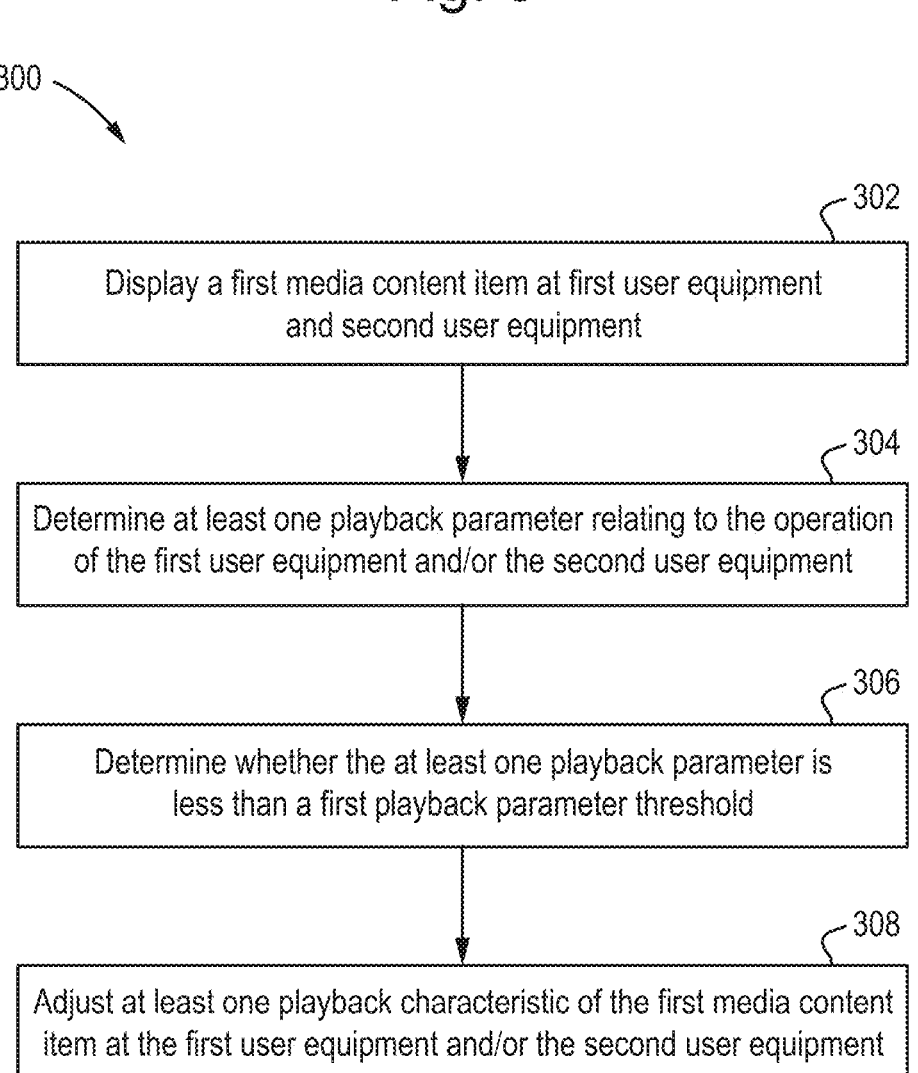

300

302

Display a first media content item at first user equipment and second user equipment

304

Determine at least one playback parameter relating to the operation of the first user equipment and/or the second user equipment

306

Determine whether the at least one playback parameter is less than a first playback parameter threshold

308

Adjust at least one playback characteristic of the first media content item at the first user equipment and/or the second user equipment

Fig. 4B

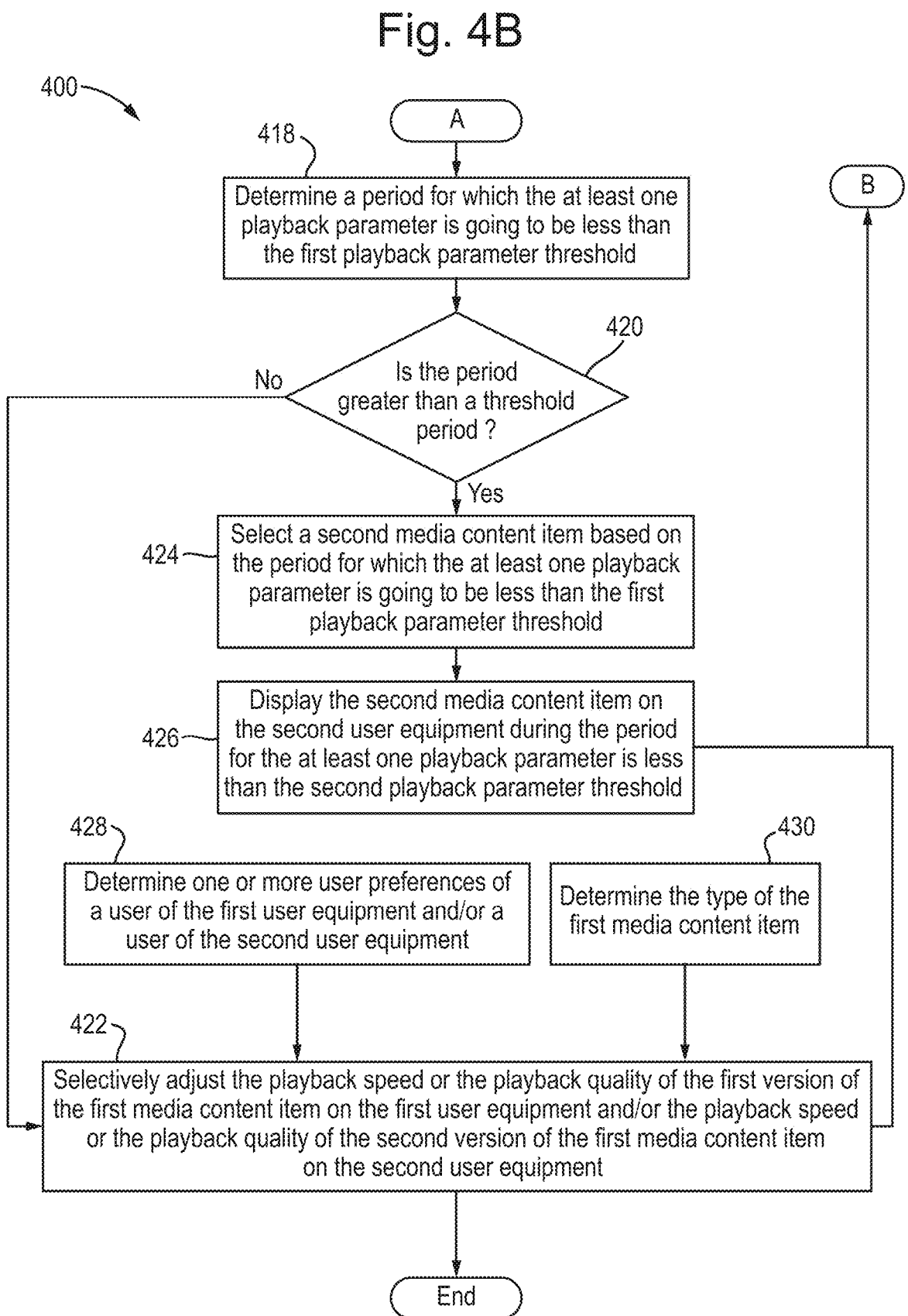

400

A

418

Determine a period for which the at least one playback parameter is going to be less than the first playback parameter threshold

420

Is the period greater than a threshold period ?

No

Yes

424

Select a second media content item based on the period for which the at least one playback parameter is going to be less than the first playback parameter threshold

426

Display the second media content item on the second user equipment during the period for the at least one playback parameter is less than the second playback parameter threshold

B

428

Determine one or more user preferences of a user of the first user equipment and/or a user of the second user equipment

430

Determine the type of the first media content item

422

Selectively adjust the playback speed or the playback quality of the first version of the first media content item on the first user equipment and/or the playback speed or the playback quality of the second version of the first media content item on the second user equipment End

METHODS AND SYSTEMS FOR SYNCHRONIZING PLAYBACK OF MEDIA CONTENT ITEMS

CROSS REFERENCE TO RELATED APPLICATIONS

This application is a continuation of U.S. patent application Ser. No. 17/398,487, filed Aug. 10, 2021, the disclosures of which is hereby incorporated by reference herein in its entirety.

BACKGROUND

The present disclosure relates to methods and systems for synchronizing playback of media content items, and in particular, but not exclusively, to exchanging user equipment operating statistics during a group viewing session to synchronize the display of a media content item on a plurality of user equipment.

SUMMARY

Nowadays, there is an increasing trend for the consumption of media content from the home, yet people may wish to share a viewing experience with others, who may be in different locations. However, it is not always possible for people to gather at one place and consume media content together at the same time, e.g., due to a large distance between people wishing to share a viewing experience, or even restrictions on travel preventing people from gathering for a group session.

To address this need, service providers have started to offer group watching capability, where the viewing of a media content item can be synchronized on multiple user equipment, e.g., so that friends and family can gather virtually through the group watching service to watch the media content even when apart. However, current group watching services lack the sophistication to address the constraints of each user who joins a group watching session. For example, different users having different availabilities of bandwidth, may result in a user having a lower available bandwidth going out of sync from another user having a higher available bandwidth, e.g., due to buffering or stalling. As a result, the overall quality of the group watching experience is reduced, since different users of the group watching session may be unable to follow conversation between other users of the group watching session, for example.

Systems and methods are provided herein for synchronizing playback of media content items. Such systems and methods may provide an improved group viewing experience, e.g., by automatically adjusting, for each viewer participating in a group watching session, one or more playback characteristics of a media content item being viewed.

According to some examples of the systems and methods provided herein, a first media content item is displayed, e.g., concurrently, at multiple user equipment devices, e.g., first user equipment and second user equipment. For example, a first media content item may be displayed as part of a group watching session that multiple users join, e.g., from different locations, to view the same media content item, or similar versions of the media content item, at substantially the same time. At least one playback parameter relating to the operation of the first user equipment and/or the second user equipment is determined. For example, a playback parameter may be any factor or factors that contribute to or define the operation of the user equipment to allow the user equipment to display a media content item, such as bandwidth available to the user equipment and/or the amount of data buffered by the user equipment, amongst others. The at least one playback parameter may be compared to a first playback parameter threshold to determine whether the at least one playback parameter is less than, equal to or greater than the first playback parameter threshold. For example, the first playback parameter threshold may be a bandwidth limit, e.g., a lower bandwidth limit such as 5 megabits per second, and/or a buffered data limit, e.g., a lower buffered data limit such as 10 seconds of buffered data. For example, the at least one playback parameter may comprise a bandwidth available to the first user equipment, a bandwidth available to the second user equipment, an amount of data buffered on the first user equipment, and/or an amount of data buffered on the second user equipment. In response to determining that the at least one playback parameter is less than the first playback parameter threshold, at least one playback characteristic of the first media content item is adjusted at the first user equipment and/or at least one playback characteristic of the first media content item is adjusted at the second user equipment, e.g., to synchronize the display of the first media content item at the first user equipment and the second user equipment. For example, the at least one playback characteristic may comprise a playback speed of the first media content item at the first user equipment, a playback speed of the first media content item at the second user equipment, a playback quality of the first media content item at the first user equipment, and/or a playback quality of the first media content item at the second user equipment. In some examples, the playback speed of the first media content item may be adjusted, e.g., increased or decreased, at the first user equipment and/or the second user equipment to synchronize the display of the first media content item. In some examples, the playback quality of the first media content item may be adjusted, e.g., increased or decreased, at the first user equipment and/or the second user equipment to synchronize the display of the first media content item. In some examples, the at least one playback characteristic of the first media content item may be adjusted to effect a change in the at least one playback parameter.

In some examples, the at least one playback parameter relating to the operation of the first user equipment and/or the second user equipment is monitored, e.g., for a predetermined period. An average value for the at least one playback parameter may be determined, e.g., over the predetermined period. The at least one playback parameter, and/or the average value for the at least one playback parameter, may be compared to the playback parameter threshold to predict whether the at least one playback parameter will be, or is likely to be, less than the first playback parameter threshold, e.g., at a future point in time of the group watching session. For example, based on monitoring the at least one playback parameter over the predetermined period, a drop in a bandwidth and/or an amount of buffered data at the first and/or second user equipment may be predicted or identified, which may indicate that there will be, or is likely to be, an interruption in the display of the first media content item on the first and/or second user equipment, e.g., a stalling of 1 second in a subsequent 10 seconds of display, based on a lack of available bandwidth and/or not enough buffered data.

In some examples, a period for which the at least one playback parameter is less than the first playback parameter threshold may be determined. The playback speed or the playback quality may be selectively adjusted based on the period for which the at least one playback parameter is less than the first playback parameter threshold.

In some examples, one or more user preferences of a user of the first user equipment and/or a user of the second user equipment may be determined. The playback speed or the playback quality may be selectively adjusted based on the one or more user preferences.

In some examples, the type of the first media content item may be determined. The playback speed or the playback quality may be selectively adjusted based on the type of the first media content item.

In some examples, a period for which at least one playback parameter of the first user equipment is less than the first playback parameter threshold may be determined. The period for which at least one playback parameter of the first user equipment is less than the first playback parameter threshold may be compared to a threshold period (or value) to determine whether the period is greater than the threshold period. In response to determining that the period is greater than the threshold period, a second media content item may be selected for display, e.g., on the first and/or second user equipment. For example, the second media content item may be displayed on the second user equipment during the period for which the at least one playback parameter of the first user equipment is shorter than the first playback parameter threshold.

In some examples, the at least one playback parameter may be determined prior to displaying the first media content item (e.g., starting the group watching session). A first version of the first media content item may be selected for display at first user equipment, e.g., based on the at least one playback parameter determined prior to starting the group watching session. A second version of the first media content item may be selected for display at the second user equipment, e.g., based on the at least one playback parameter determined prior to starting the group watching session.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 illustrates an overview of a system displaying media content in a group watching session, in accordance with some examples of the disclosure;

FIG. 3 is a flowchart representing a process for synchronizing media content during a group watching session, in accordance with some examples of the disclosure;

FIG. 4B is a continuation of the flowchart in FIG. 4A.

DETAILED DESCRIPTION

Figure 1:
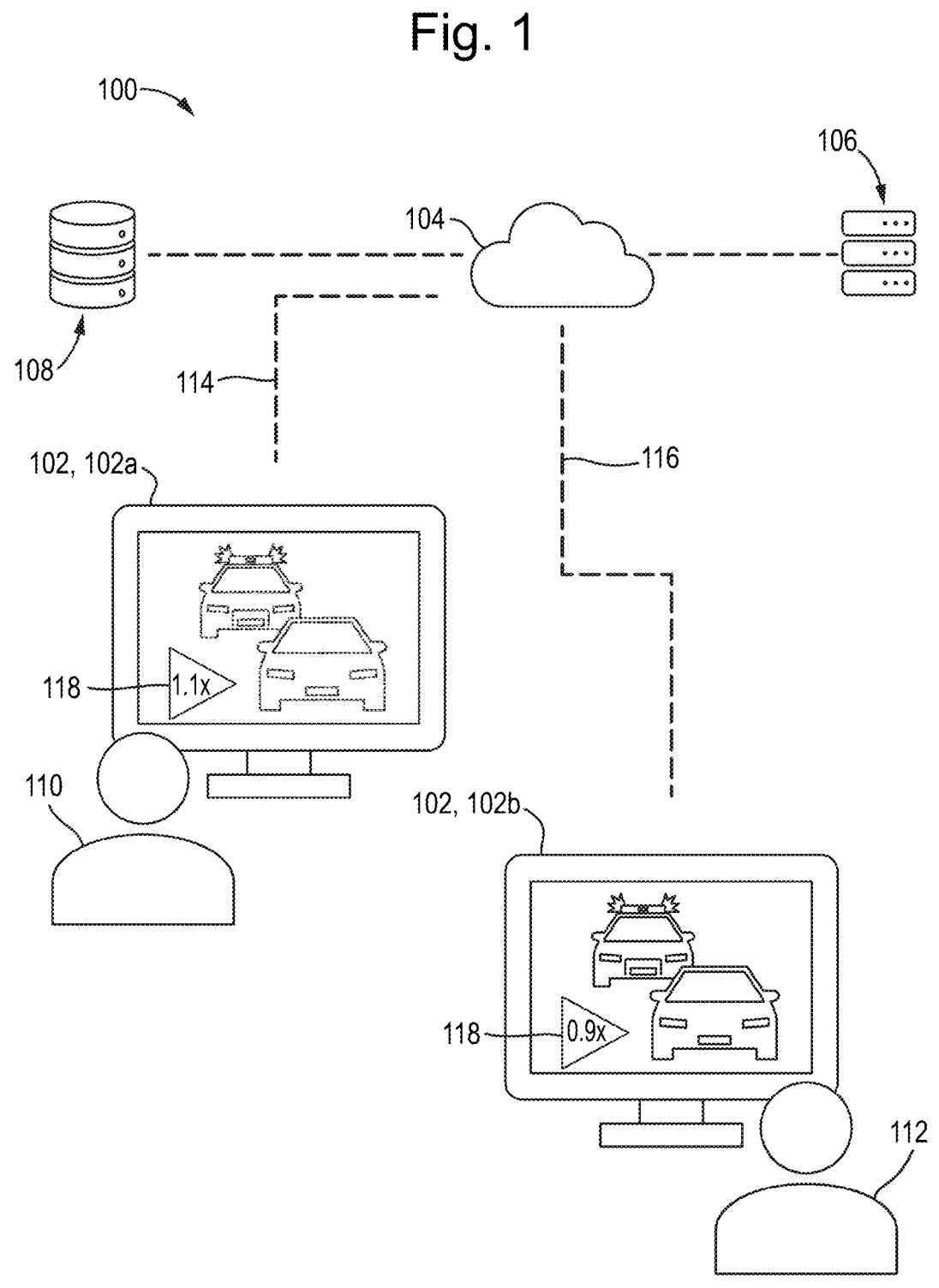
Figure 2:
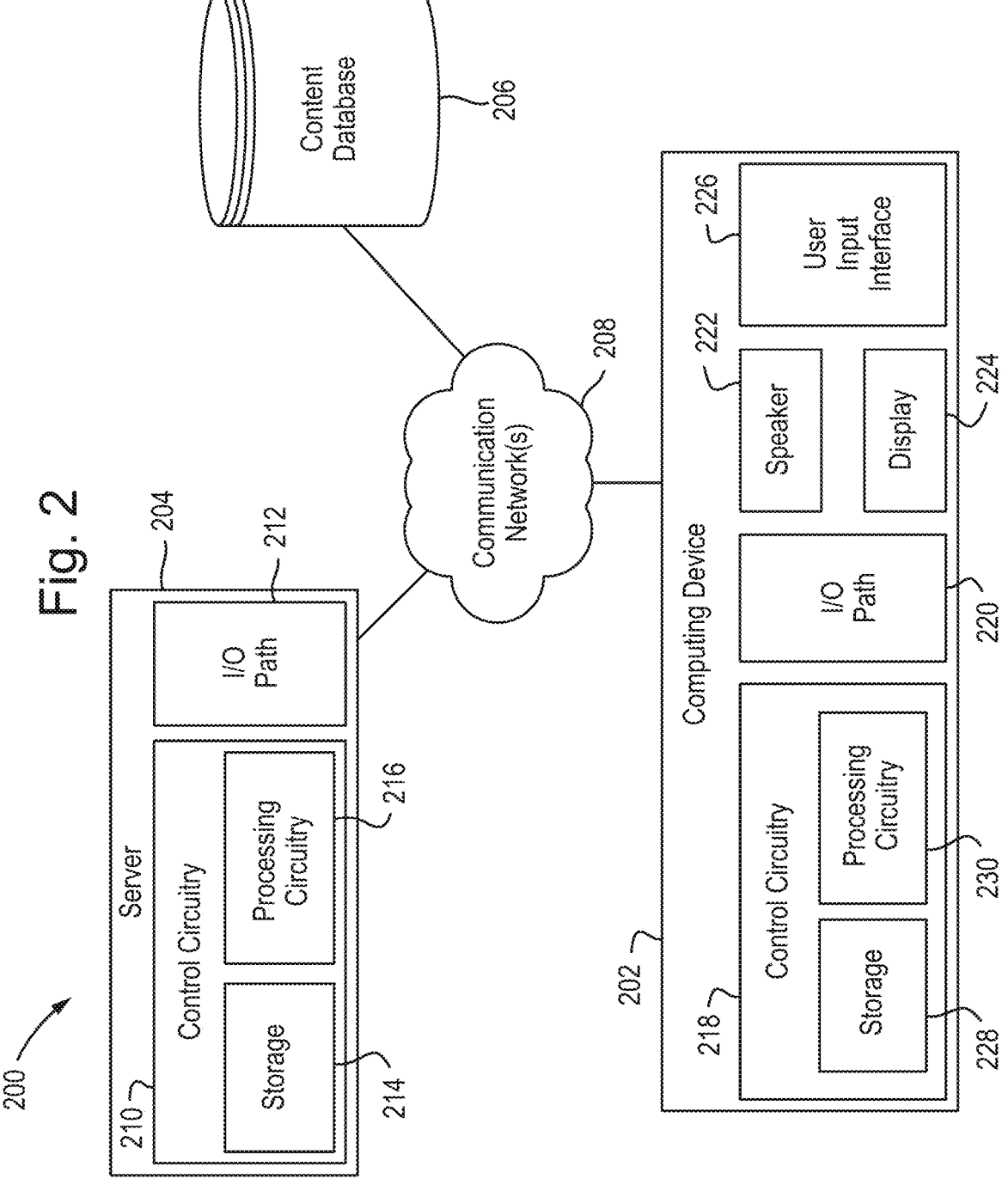
FIG. 2 is a block diagram showing components of an exemplary system for providing a group watching session, in accordance with some examples of the disclosure.

FIG. 1 illustrates an overview of a system 100 for synchronizing the display of media content items, e.g., across a plurality of user equipment, in accordance with some examples of the disclosure. In some examples, system 100 includes user equipment 102, such as a tablet computer, a smartphone, a smart television, or the like, configured to display media content to the user. System 100 may also include network 104, such as the Internet, configured to communicatively couple user equipment 102 to one or more servers 106 and/or one or more content databases 108 from which media content may be obtained for display on the user equipment 102. User equipment 102 and server 106 may be communicatively coupled to one another by way of network 104, and server 106 may be communicatively coupled to content database 108 by way of one or more communication paths, such as a proprietary communication path and/or network 104.

In some examples, system 100 may comprise an application that provides guidance through an interface, e.g., a graphical user interface, that allows users to join a group watching session and efficiently navigate media content selections and easily identify media content that they may desire, such as content provided on a database on one or more live streams. Such guidance is referred to herein as an interactive content guidance application or, sometimes, a content guidance application, a media guidance application, or a guidance application. In some examples, the application may be configured to provide a recommendation for a content item, e.g., based on the operational capabilities of user equipment 102. For example, the application may provide a user with a selectable option for displaying a media content item that is suitable for a group watching session.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, subtitle data, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 2 is an illustrative block diagram showing exemplary system 200 configured to display media content. Although FIG. 2 shows system 200 as including a number and configuration of individual components, in some examples, any number of the components of system 200 may be combined and/or integrated as one device, e.g., as user equipment 102. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified subtitles. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions, e.g., to request modified subtitles, to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

FIG. 3 is a flowchart representing an illustrative process 300 for synchronizing the displaying of media content across multiple user equipment, in accordance with some examples of the disclosure. While the example shown in FIG. 3 refers to the use of system 100, as shown in FIG. 1, it will be appreciated that the illustrative process shown in FIG. 3, and any of the other following illustrative processes, may be implemented on system 100 and system 200, either alone or in combination, or on any other appropriately configured system architecture.

At step 302, a first media content item, e.g., primary media content, is displayed, e.g., concurrently, at first user equipment 102a and second user equipment 102b, e.g., using control circuitry. For example, control circuitry may be configured to allow user 110 and user 112 to each select and view the first media content item using a content guidance application, e.g., as part of a group watching session, so that each of user 110 and user 112 can watch the same first media content item, or a similar version of the first media content item, at the same time. In FIG. 1, users 110, 112 have each selected to join a group watching session to view a movie comprising a car chase scene. However, the first media content item may comprise any type of audio and/or visual media content. For example, the media content item may be a transmission of a live event, such as a football game, or an audio recording of a concert.

At step 304, control circuitry determines at least one playback parameter relating to the operation of the first user equipment 102a and/or the second user equipment 102b. In the context of the present disclosure, the term playback parameter is understood to mean any numerical or other measurable factor forming one of a set that defines how system 100 operates or sets the conditions of its operation. For example, one playback parameter may be an amount of bandwidth available to user equipment 102. Another playback parameter may be an amount of data buffered by user equipment 102. As such, control circuitry may be configured to determine an amount of bandwidth available to each of the first user equipment 102a and the second user equipment 102b, and/or an amount of data buffered by each of the first user equipment 102a and the second user equipment 102b. Control circuitry may be configured to determine the amount of available bandwidth and/or the amount of data buffered by at least one of the first user equipment 102a and the second user equipment 102b at any given point in time. Additionally or alternatively, control circuitry may be configured to monitor, e.g., over a predetermined period, how the available bandwidth varies and/or how the amount of data buffered changes, e.g., during a group watching session. In some examples, data relating to one or more determined playback parameters may be stored, e.g., in storage of server 106. In this manner, control circuitry is able to analyze data relating to live and/or historic playback parameters for at least one of the first user equipment 102a and the second user equipment 102b. For example, control circuitry may analyse data relating to the playback parameters of the first and second user equipment 102a, 102b to determine that the first user equipment 102a has a higher amount of available bandwidth compared to the second user equipment 102b, at any given instant and/or as an historical average. In other words, control circuitry may be configured to determine, store and/or analyse live and/or historic playback parameters, e.g., playback parameter statistics, relating to the operation of the first user equipment 102a and/or the second user equipment 102b. In the example shown in FIG. 1, the first user equipment 102a is connected to server 106 by virtue of a first network connection 114, and the second user equipment 102b is connected to server 106 by virtue of a second network connection 116. Control circuitry, such as control circuitry of server 106, may be configured to determine and/or monitor one or more playback parameters relating to the operation of the first user equipment 102a and/or the second user equipment 102b, such as a speed of network connection 114, 116. Additionally or alternatively, first user equipment 102*a* and/or the second user equipment 102*b* may be configured to determine and/or monitor one or more playback parameters relating to their own operation, and transmit data relating to one or more of their playback parameters (e.g., playback parameter statistics) to server 106. In some examples, first user equipment 102*a* and the second user equipment 102*b* may be configured to exchange data, e.g., directly, relating to one or more of their playback parameters (e.g., playback parameter statistics), such that only one of the first user equipment 102*a* and the second user equipment 102*b* need communicate with server 106. In some examples, server 106 may be configured to transmit data relating to one or more of the playback parameters (e.g., playback parameter statistics) of one of the first user equipment 102*a* and the second user equipment 102*b* to the other of the first user equipment 102*a* and the second user equipment 102*b*. In this manner, each of the first user equipment 102*a*, the second user equipment 102*b* and the server may be able to analyse playback parameters relating to the operation of the first user equipment and/or the second user equipment, e.g., to determine a set of playback parameter statistics including playback parameter data for each of user equipment 102 in a group watching session.

At step 306, control circuitry determines whether at least one playback parameter relating to the operation of the first user equipment 102*a* and/or the second user equipment 102*b* is less than a first playback parameter threshold, which may relate to any operational parameter that affects the synchronization of the display of the first media content item across the first user equipment 102*a* and the second user equipment 102*b* during the group watching session. For example, control circuitry may determine that the bandwidth available to the first user equipment 102*a* has dropped below a threshold bandwidth value. When the bandwidth available to first user equipment 102*a* drops below the threshold bandwidth value, an interruption in the display of the first media content item at first user equipment may be experienced by user 110, which may cause user 110 to be unable to follow conversation between other users of the group watching sessions. Additionally or alternatively, control circuitry may determine that the amount of buffered data at the first user equipment 102*a* has dropped below a threshold buffered data value. When the amount of buffered data available to first user equipment 102*a* drops below the threshold buffered data value, an interruption in the display of the first media content item at first user equipment may be experienced by user 110, which may cause user 110 to be unable to follow conversation between other users of the group watching sessions. In some examples, the threshold value for the bandwidth and/or the buffered data may be set according to a predetermined value, e.g., a value that is standardized across all the user equipment 102 participating in the group watching session, e.g., based on a setting received from server 106, or a value that is set individually for each user equipment 102, e.g., based on one or more user preferences. In some examples, the threshold values for the bandwidth and/or the buffered data may be dynamic values, e.g., values that are updated during the group watching session based on playback parameter statistics for the participants in the group watching session.

At step 308, control circuitry adjusts at least one playback characteristic of the first media content item at the first user equipment 102*a* and/or the second user equipment 102*b*. In the context of the present disclosure, the term playback characteristic is understood to be one or more audio and/or visual characteristics of a media content item, e.g., that are experienced by a user during the viewing of the media content item, such as image quality, sound quality, frame rate, etc. As such, step 308 may comprise adjusting one or more playback characteristics of the first media content item displayed on either or both of the first user equipment 102*a* and the second user equipment 102*b*. Where one or more playback characteristics are adjusted on both the first user equipment 102*a* and the second user equipment 102*b*, the adjusting need not relate to the same or similar playback characteristics. For example, in some scenarios, step 308 may comprise adjusting the audio/visual quality of the display of the first media content item on the first user equipment 102*a* and adjusting the frame rate of the first media content item on the second user equipment 102*b*.

Returning to the examples given relating to step 306, where it has been determined that the bandwidth available to the first user equipment 102*a* has dropped below a threshold bandwidth value, and thus an interruption in the display of the first media content item on the first user equipment 102*a* is possible, control circuitry may increase the frame rate (playback speed) of the first media content item displayed on the first user equipment 102*a*, e.g., to compensate for a period of interruption in the display of the first media content item on the first user equipment 102*a*. Additionally or alternatively, control circuitry may decrease the frame rate (playback speed) of the first media content item displayed on the second user equipment 102*b*, e.g., to compensate for the period of interruption in the display of the first media content item on the first user equipment 102*a*. For example, consider a scenario where an interruption in the display of the first media content item is identified or predicted based on the group playback statistics, which show that first user equipment 102*a* is going to experience drop in bandwidth, which would result in stalling of 1 second in a subsequent 10-second period. In this case, the playback speed may be reduced, e.g., from 1× to 0.9×, on the second user equipment 102*b* having good bandwidth, and the playback speed may be increased, e.g., from 1× to 1.1×, on the first user equipment 102*a* on which an interruption is expected to occur. In this manner the first and second users 110, 112 will each watch 9 seconds of content in the next 10 seconds in spite of the first user 110 experiencing an interruption in the display of the first media content item. Thus, both the first and second users 110, 112 will remain in sync after the period of low available bandwidth at the first user equipment. In some examples, control circuitry may be configured to automatically cause an increase or reduction in the playback speed by an amount that is not noticeable to the user, e.g., by 1% or 2%. In other examples, an increase or reduction in the playback speed may be more significant, e.g., by 10%. In such cases, control circuitry may display an icon 118, which informs the user of the adjustment to the playback speed. In some examples, the expected duration of the adjustment to the playback speed may also be indicated to the user.

Additionally or alternatively, where it has been determined that the amount of buffered data available to first user equipment 102*a* drops (or is going to drop) below the threshold buffered data value, control circuitry, at step 308, may adjust the audio and/or visual quality of the display of the first media content item at the first user device 102*a*. For example, control circuitry may determine that the second user equipment 102*b* has available bandwidth that is sufficient to buffer 30 seconds of data, while the first user equipment 102*a* has lower available bandwidth that is sufficient to display only the first media content item, e.g., at a similar quality to the display of the first media content item on the second user equipment 102*b*, but without buffering any data. In such a case, the first user 110 may experience an interruption in the display on the first media content item on the first user equipment 102*a* as a result of little or no buffered data being stored. In such a scenario, control circuitry may reduce the audio and/or visual quality of the display of the first media content item at the first user device 102*a*, e.g., to use some of the available bandwidth for the storage of buffered data. In the example shown in FIG. 1, user device 102*a* is displaying the first media content item in a reduced quality compared to the display of the first media content item on the second user equipment. In some examples, the duration of a period of reduced quality display may be limited to a period sufficient to allow the first user equipment 102*a* to store the same, or similar, amount of buffered data as the second user equipment 102*b*, e.g., 30 seconds of buffered data. Once the amount of buffered data at the first user equipment 102*a* is similar to the amount of buffered data at the second user equipment 102*b*, the audio and/or visual quality of the display of the first media content item on the first user equipment 102*a* may be increased, e.g., to a level that allows for the amount of buffered data to be maintained at a sufficient level to allow frame-by-frame synchronization across first and second user equipment 102*a*, 102*b*.

The actions or descriptions of FIG. 3 may be used with any other example of this disclosure, e.g., the example described below in relation to FIGS. 4A and 4B. In addition, the actions and descriptions described in relation to FIG. 3 may be done in any suitable alternative orders or in parallel to further the purposes of this disclosure.

Figure 4A:
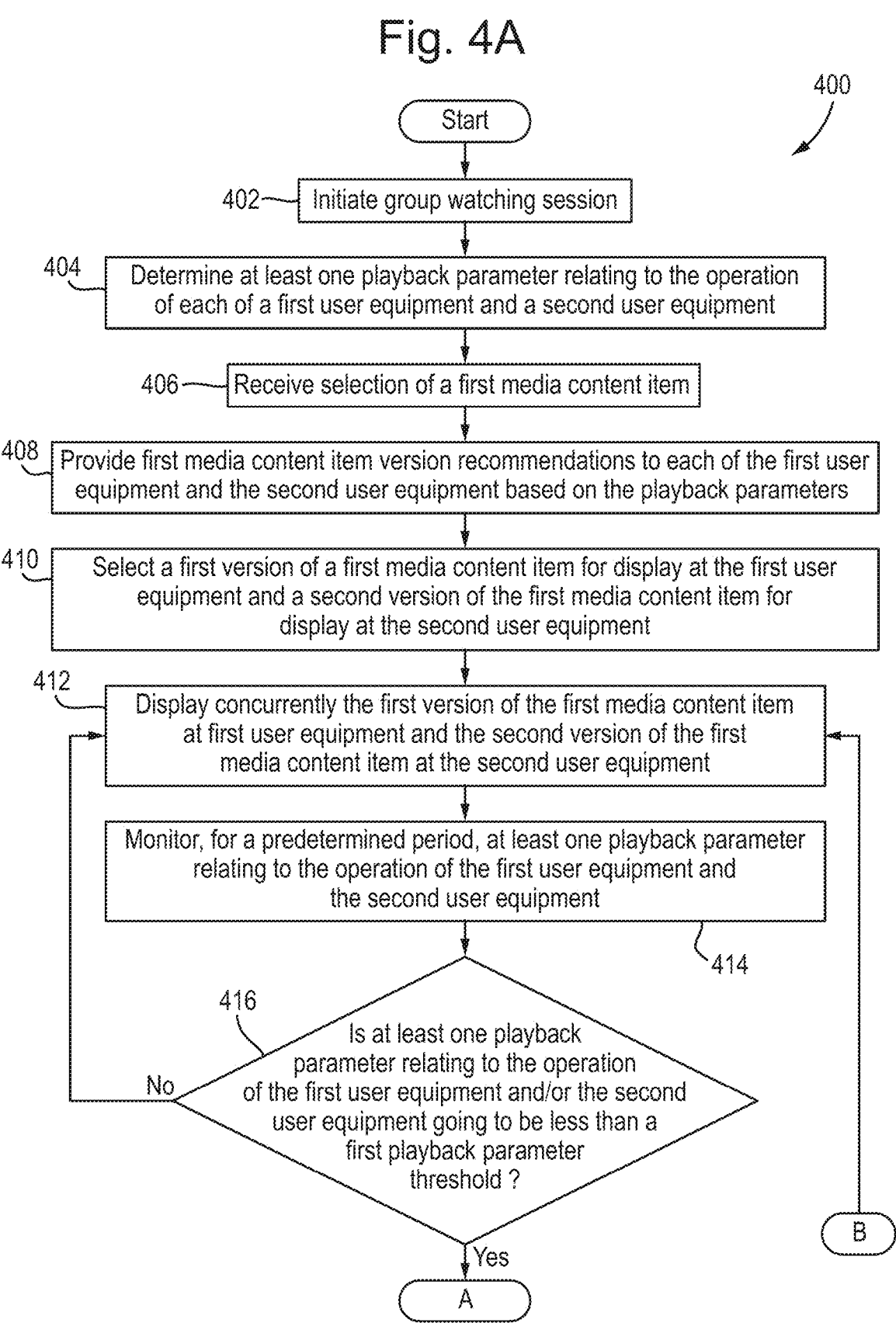
FIG. 4A is a flowchart representing another process for synchronizing media content during a group watching session, in accordance with some examples of the disclosure.

FIGS. 4A and 4B shows a flowchart representing an illustrative process for synchronizing the displaying of media content across multiple user equipment. While the example shown in FIGS. 4A and 4B refers to the use of system 100, as shown in FIG. 1, it will be appreciated that the illustrative process shown in FIGS. 4A and 4B may be implemented on system 100 and system 200, either alone or in combination, or on any other appropriately configured system architecture.

At step 402, control circuitry initiates a group watching session on multiple user equipment 102, such as first user equipment 102*a* and second user equipment 102*b*. For example, first user 110 may request that a group watching session is initiated, and control circuitry may send one or more invites for other users to join the group watching session, such as second user 112. It is understood, however, that the group watching session may be initiated in any appropriate manner. Once the group watching session is initiated, control circuitry may be configured to allow the exchange of data between each of server 106, first user equipment 102*a* and second user equipment 102*b*. For example, process 400 may comprise a step of receiving at server 106 data relating to one or more playback parameters of the first user equipment 102*a* and second user equipment 102*b*. In some cases, the server may receive a set of playback statistics comprising playback parameter data from each of the user equipment 102 that have joined the group watching session.

At step 404, control circuitry determines at least one playback parameter relating to the operation of each of a first user equipment 102*a* and a second user equipment 102*b*, e.g., prior to the display of a first media content item on either of the first user equipment 102*a* and second user equipment 102*b*. The determination of the at least one playback parameter may be made in a similar manner to that described in relation to step 304 of process 300. For example, control circuitry may determine the available bandwidth, e.g., current and/or historical, at each of the first user equipment 102*a* and second user equipment 102*b*, and/or any other appropriate playback parameter, such as the processing/operational capabilities of the first user equipment 102*a* and second user equipment 102*b*, which may affect the ability of user equipment to display a media content item. In some examples, step 404 may be performed as a pre-display check to determine the respective capabilities of each of the user equipment 102 that have joined the session.

At step 406, control circuitry receives a selection of a first media content item from one of the first user 110 and the second user 112. For example, first user 110 may issue a command to the first user equipment 102*a* to display a first media content item on each of the user equipment 102 participating in the group watching session.

At step 408, control circuitry provides first media content item version recommendations to each of the first user equipment 102*a* and the second user equipment 102*b*, e.g., based on the determination of the at least one playback parameter relating to the operation of each of a first user equipment 102*a* and a second user equipment 102*b*.

In some cases, when the users 110, 112 of a group watching session decide to watch a first media content item, the control circuitry can determine the most suitable version (or versions) of the first media content item for use in the group watching session, e.g., based on playback parameter statistics for the group determined at step 404. For example, if one of the users 110, 112 is expected to have bandwidth issues during the group watching session, then control circuitry would recommend a lower-quality version, e.g., HD content, instead of a higher-quality version, such as 4K content. This is because the user who is expected to have bandwidth issues will not be able to view higher-quality content, e.g., for the entire duration of the group watching session. In some examples, after the start of the group watching session, when the playback parameter statistics indicate that none of the users are likely to experience bandwidth issues, higher quality content can be recommended to all users, and the display of the first media content item may be changed from a lower-quality version to a higher-quality version for each user in the group watching session. In other examples, control circuitry may determine that a particular version of the first media content item is most suitable for display on each of user equipment 102 that have joined the group watching session. For example, control circuitry may determine that one or more versions of the first media content item are more suitable for display on first user equipment 102*a* than on the second user equipment 102*b*. In some cases, when the users of a group watching session decide to watch a first media content item, the control circuitry may recommend a first version of the media content item for display at the first user equipment 102*a* and a second version of the media content item for display at the second user equipment 102*b*, e.g., based on the playback parameters for the respective user equipment.

At step 410, a first version of the first media content item is selected for display at the first user equipment, and a second version of the first media content item is selected for display at the second user equipment. In some examples, selection of which version of the first media content item to display may be made automatically, e.g., based on one or more user preferences stored in a user profile.

At step 412, the first version of the first media content item is displayed at the first user equipment 102*a* and the second version of the first media content item is displayed at the second user equipment 102*b*. At the start of the group watching session, each of the versions of the first media content items may be displayed concurrently, e.g., in a manner whereby the display of the different versions are synchronized substantially at a frame-by-frame level, such that the first user 110 and the second user 112 are viewing the first media content item at substantially the same time, e.g., within a frame synchronization range of approximately 0-5 seconds.

At step 414, control circuitry monitors, e.g., for a predetermined period, at least one playback parameter relating to the operation of the first user equipment 102*a* and the second user equipment 102*b*. For example, control circuitry may monitor at least one of available bandwidth and an amount of data buffered at the first user equipment 102*a* and the second user equipment 102*b*. In some examples, the predetermined period may be set, by a service provider who hosts the group watching session, e.g., at an appropriate amount of time for the service provider to build up a large enough set of playback statistics relating to the playback parameters indicating an operational state of each of a first user equipment 102*a* and a second user equipment 102*b*. For example, the predetermined period may a period from the start of the group watching session up to an elapsed viewing time of the first media content item. Alternatively, the predetermined period may be set to a certain value, e.g., approximately 1-10 minutes. In some examples, the predetermined period may be set according to the number of participants in the group watching session, e.g., the predetermined period to a larger value where there is a larger number of participants in the group watching session. Irrespective of how the predetermined period is set, the monitoring of the at least one playback parameter relating to the operation of the first user equipment 102*a* and the second user equipment 102*b* is carried out so that changes in the at least one playback parameter can be determined during the group watching session. For example, control circuitry may be configured to perform one or more analytical methods on the group playback statistics to determine the likelihood of one or more playback parameters relating to the operation of the first user equipment 102*a* and the second user equipment 102*b* dropping below a first playback parameter threshold.

At step 416, control circuitry determines whether at least one playback parameter relating to the operation of the first user equipment and/or the second user equipment is going to be less than a first playback parameter threshold, e.g., within a period starting from the current elapsed viewing time. For example, control circuitry may predict, based on historic and/or current playback parameter data, whether the first user 110 and/or the second user 112 will (or, at least, is likely to) experience an interruption in the display of the first media content item at respective user equipment 102*a*, 102*b*, e.g., within 30 seconds from the current elapsed viewing time. In some examples, control circuitry may use bandwidth data indicating the quality of a network connection, e.g., network connection 114, gathered during step 414 to determine that the network connection 114 will degrade to below a level that can support the display of the first version of the first media content item on the first user equipment 102*a*. Additionally or alternatively, control circuitry may use data indicating the size of a buffer, e.g., the amount of buffered data stored at first user equipment 102*a*, gathered during step 414, to determine that the amount of buffered data will fall to a level that may result in an interruption of the display of the first version of the first media content item on the first user equipment 102*a*. In some examples, control circuitry may use one or more statistical analysis techniques to predict the likelihood that at least one playback parameter relating to the operation of the first user equipment and/or the second user equipment is going to be less than the first playback parameter threshold, e.g., within a period starting from the current elapsed viewing time. For example, control circuitry may determine statistics relating to adaptive bitrate streaming, such as the number of bitrate switches and/or the duration of one or more bitrate switches performed by the first user equipment and/or the second user equipment, e.g., within a period between the start of the group watching session and the current elapsed viewing time, and/or within other historical periods. In some examples, control circuitry may determine a maximum internet connectivity bandwidth that the user is subscribed to, e.g., by analyzing past internet connectivity bandwidth data and/or by requesting data from a service provider. In some examples, data relating to one or more playback parameters can be collated at the first user equipment and/or the second user equipment throughout the day, which may be used to indicate network variation patterns respective users are facing on that day, and thus used to predict the interruptions at each user. When it is determined that an interruption in the display of the first media content item is not going to happen, or the likelihood of an interruption in the display of the first media content item is sufficiently low, process 400 moves back to step 412 (or 414). Where it is determined that an interruption in the display of the first media content item is going to happen, or the likelihood of an interruption in the display of the first media content item is sufficiently high, process 400 moves to step 418.

At step 418, control circuitry determines a period for which the at least one playback parameter is going to be (or is) less than the first playback parameter threshold. For example, control circuitry may determine the duration of an expected interruption, e.g., based on current and/or historic playback parameter data (e.g., based on group playback parameter statistics).

At step 420, control circuitry determines whether the period for which the at least one playback parameter is going to be (or is) less than the first playback parameter threshold is greater than a threshold period, e.g., a threshold interruption period. For example, control circuitry may determine that the duration of an expected interruption in the display of the first media content item is greater than the threshold interruption period. In some cases, the threshold interruption period may be set by a service provider hosting the group watching session. In other cases, the threshold interruption period may be set by user 110, 112, or may be set automatically based on one or more user preferences in a user profile. The duration of the expected interruption is determined and compared to the threshold interruption period such that control circuitry can decide on an appropriate course of action. For example, where the duration of the expected interruption is less than the threshold interruption period, process 400 moves to step 422, e.g., to take action similar to step 308 in process 300. Where the duration of the expected interruption is greater than the threshold interruption period, process 400 moves to step 424. Thus, inherent in step 420 is a determination that the expected interruption is too long for the adjustment of at least one playback characteristic of the first media content item to be effective in synchronizing the display of the first media content item on the user equipment 102.

At step 424, control circuitry selects a second media content item based on the period for which the at least one playback parameter is going to be less than the first playback parameter threshold, e.g., based on the duration of the expected interruption. For example, control circuitry may access a content database having a plurality of second media content items of varying lengths. The second media content item may comprise content relevant to the first media content item, e.g., the second media content item may comprise content recapping the content of the first media content item. In some examples, the second media content item may comprise content corresponding to one or more user preferences stored in a user profile.

At step 426, control circuitry continues to display the first media content item until the expected interruption starts. For example, control circuitry continues to display the first version of the first media content item at the first user equipment 102*a* and the second version of the first media content item at the second user equipment 102*b*. In an example where the expected interruption is during the display of the first media content item at the first user equipment 102*a*, control circuitry pauses the display of the first media content item at the second user equipment 102*b* as the interruption begins during the display of the first media content item at the first user equipment 102*a*. In this manner, the second user 112 does not progress further than the first user 110. At such point, e.g., where the group watching session is paused for the first user 110 and the second user 112, control circuitry may cause the display of the selected second media content item on the second user equipment until the bandwidth and/or the amount of buffered data available to the first user equipment 102*a* is at least partially restored, e.g., to a level that allows the display of the first media content item at the first user equipment 102*a* to resume. In some examples, a second media content item may be displayed on the first user equipment 102*a* during the period of interruption. However, in such cases, the second media content item may be accessible to the first user equipment 102*a* without network connection 114. In some examples, in response to determining that an interruption in the display of the first media content item is expected, control circuitry may cause a second media content item to be downloaded, such that the second media content item can be viewed without a network connection. Once the period of interruption has elapsed, and the second media content item has been displayed, process 400 returns to step 412 (or 414) and the group watching session is resumed.

In examples where the period of interruption is less than the threshold interruption period, process 400 moves to step 422, where control circuitry selectively adjusts the playback speed or the playback quality of the first version of the first media content item on the first user equipment and/or the playback speed or the playback quality of the second version of the first media content item on the second user equipment, e.g., based on step 428 and step 430. For example, there are certain conditions under which an adjustment to the playback speed may be preferred over an adjustment to the playback quality, or vice versa, such as conditions relating to user preference and/or the type, e.g., genre, of the first media content item being displayed during the group watching session.

At step 428, control circuitry determines one or more user preferences of one or more users who are participating in the group watching session. For example, control circuitry may access a user profile of the first user 110 and/or a user profile of the second user 112, to determine a user preference for viewing media content at an adjusted quality or an adjusted playback speed.

At step 430, control circuitry determines the type of the first media content item, e.g., based on metadata for the first media content item, which may be accessible by at least the first user equipment 102*a*, the second user equipment 102*b* and the server 106 over network 104. For example, control circuitry may determine the genre of the first media content item, or the type of content being shown in a particular scene or frame of the first media content item. In some cases, it may be preferable to adjust the playback quality over an adjustment to the playback speed. For example, where the first media content item comprises a fast-paced content item having lots of speech, it may be desirable to reduce the quality of a visual characteristic, while the quality of the audio characteristics and the playback speed are maintained. However, in other examples, it may be preferable to adjust a different playback characteristic, or combination of playback characteristics, based on the type of content being displayed in the group watching session, e.g., in a period leading up to the expected interruption.

Following the above example where the interruption is expected to occur on the first user equipment 102*a*, at step 422, control circuitry selectively adjusts one or more playback characteristics of the first version of the first media content item being displayed on the first user equipment 102*a*. Selection of which playback characteristic(s) to adjust may be made following the determinations made in step 428 and/or step 430. In examples where step 428 and/or step 430 has not been carried out, the control circuitry selectively adjusts one or more playback characteristics of the first version of the first media content item being displayed on the first user equipment 102*a* based on a default setting that is set to minimize the period for which the one or more playback characteristics of the first version of the first media content item are adjusted, which aims at minimizing any reduction in playback quality for one or more users in the group watching session. Process 400 then returns to step 412 (or 414) and repeats for the duration of the group watching session.

The actions or descriptions of FIGS. 4A and 4B may be used with any other example of this disclosure. In addition, the actions and descriptions described in relation to FIGS. 4A and 4B may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

causing a first user device and a second user device to synchronously display a media content item transmitted from at least one of a plurality of servers;

monitoring available bandwidth and available buffered data of the first user device;

based on the monitoring, predicting an interruption of the display of the media content item at the first user device;

determining a time duration of the predicted interruption; and based on the determined time duration of the predicted interruption:

while the display of the media content item by the first user device and the second user device is synchronized: causing, by at least one of the plurality of servers, the display of the media content item by the first user device and the second user device to become temporarily desynchronized by modifying play speed of the media content item for at least one of the first user device or the second user device, wherein parameters for modifying the play speed are selected based on the determined time duration of the predicted interruption such that the first user device and the second user device resume synchronously displaying the media content item after the predicted interruption.

2. The method of claim 1, wherein the predicting the interruption of the display of the media content at the first user device comprises:

based on analyzing network variation patterns associated with the first user device, determining that the available bandwidth and the available buffered data of the first user device will be below a threshold bandwidth value and a threshold buffered data value respectively.

3. The method of claim 2, wherein the threshold bandwidth value and the threshold buffered data value are predetermined values based on at least one of:

settings received from the first user device; or settings received from a server.

4. The method of claim 2, wherein the threshold bandwidth value and the threshold buffered data value are dynamic values based on analyzing the available bandwidth and the available buffered data of the first user device and the second user device.

5. The method of claim 1, wherein the time duration of the predicted interruption is determined based on current playback parameter data and/or historic playback parameter data.

6. The method of claim 1, further comprising:

determining user preferences associated with the first user device and user preferences associated with the second user device, wherein modifying the play speed of the media content item for at least one of the first user device or the second user device comprises:

modifying the play speed based on the respective determined user preferences associated with at least one of the first user device or the second user device.

7. The method of claim 1, wherein based on the determined time duration of the predicted interruption, the method further comprises:

reducing a playback quality of the media content at the first user device.

8. The method of claim 1, wherein the media content item is a first media content item, and wherein based on the determined time duration of the predicted interruption, the method further comprises:

causing the second user device to display a second media content item, wherein a time duration of the second media content item corresponds to the determined time duration of the predicted interruption.

9. The method of claim 1, wherein the predicted interruption occurs at the first user device when an amount of the available buffered data is insufficient to cause the first user device to display the media content item.

10. The method of claim 1, wherein the modifying the play speed of the media content item for at least one of the first user device or the second user device comprises at least one of:

increasing the play speed of the media content at the first user device to an increased rate associated with the determined time duration; or decreasing the play speed of the media content at the second user device to a decreased rate associated with the determined time duration.

11. A system comprising:

control circuitry configured to:

cause a first user device and a second user device to synchronously display a media content item transmitted from at least one of a plurality of servers;

input/output circuitry configured to:

receive available bandwidth and available buffered data of the first user device wherein the control circuitry is further configured to:

monitor the available bandwidth and the available buffered data of the first user device;

based on the monitoring, predict an interruption of the display of the media content item at the first user device;

determine a time duration of the predicted interruption; and based on the determined time duration of the predicted interruption:

while the display of the media content item by the first user device and the second user device is synchronized: cause, by at least one of the plurality of servers, the display of the media content item by the first user device and the second user device to become temporarily desynchronized by modifying play speed of the media content item for at least one of the first user device or the second user device, wherein parameters for modifying the play speed are selected based on the determined time duration of the predicted interruption such that the first user device and the second user device resume synchronously displaying the media content item after the predicted interruption.

12. The system of claim 11, wherein the control circuitry is configured to predict the interruption of the display of the media content at the first user device by:

based on analyzing network variation patterns associated with the first user device, determining that the available bandwidth and the available buffered data will be below a threshold bandwidth value and a threshold buffered data value respectively.

13. The system of claim 12, wherein the threshold bandwidth value and the threshold buffered data value are predetermined values based on at least one of:

settings received from the first user device; or settings received from a server.

14. The system of claim 12, wherein the threshold bandwidth value and the threshold buffered data value are dynamic values based on analyzing the available bandwidth and the available buffered data of the first user device and the second user device.

15. The system of claim 11, wherein the control circuitry is configured to determine the time duration of the predicted interruption based on current playback parameter data and/or historic playback parameter data.

16. The system of claim 11, wherein the control circuitry is further configured to:

determine user preferences associated with the first user device and user preferences associated with the second user device, wherein the control circuitry is configured to modify the play speed of the media content item for at least one of the first user device or the second user device by:

modifying the play speed based on the respective determined user preferences associated with at least one of the first user device or the second user device.

17. The system of claim 11, wherein based on the determined time duration of the predicted interruption, the control circuitry is further configured to:

reduce a playback quality of the media content at the first user device.

18. The system of claim 11, wherein the media content item is a first media content item, and wherein based on the determined time duration of the predicted interruption, the control circuitry is further configured to:

cause the second user device to display a second media content item, wherein a time duration of the second media content item corresponds to the determined time duration of the predicted interruption.

19. The system of claim 11, wherein the predicted interruption occurs at the first user device when an amount of the available buffered data is insufficient to cause the first user device to display the media content item.

20. The system of claim 11, wherein the modifying the play speed of the media content item for at least one of the first user device or the second user device comprises at least one of:

increasing the play speed of the media content at the first user device to an increased rate associated with the determined time duration; or decreasing the play speed of the media content at the second user device to a decreased rate associated with the determined time duration.

* * * * *